S. A. HUNTLEY.
AUTOMATIC LAMP FOR AUTOMOBILES AND THE LIKE.
APPLICATION FILED MAR. 28, 1918.

1,292,785.

Patented Jan. 28, 1919.

Inventor
Stephen A. Huntley,
By
Attorney

UNITED STATES PATENT OFFICE.

STEPHEN A. HUNTLEY, OF RIVERTON, WYOMING, ASSIGNOR OF ONE-HALF TO HENRY BOYD HUGHES, OF FREMONT COUNTY, WYOMING, AND ONE-HALF TO JOHN FRANKLIN HUNTLEY, OF LANDER, WYOMING.

AUTOMATIC LAMP FOR AUTOMOBILES AND THE LIKE.

1,292,785.  Specification of Letters Patent.  Patented Jan. 28, 1919.

Application filed March 28, 1918. Serial No. 225,264.

*To all whom it may concern:*

Be it known that I, STEPHEN A. HUNTLEY, a citizen of the United States of America, and resident of Riverton, in the county of Fremont and State of Wyoming, have invented certain new and useful Improvements in Automatic Lamps for Automobiles and the like, of which the following is a specification.

This invention relates to lamps for automobiles and the like and particularly to dirigible lamps.

An object of this invention is to provide novel means whereby the lamp may be turned according to the direction of travel of the automobile, as determined by the movement of the steering mechanism, and it has for its object further, the provision of novel means whereby one of the lamps may be retained so as to direct the rays or beam straight ahead, while at the same time, another lamp is being turned in the direction of travel as in rounding a curve or corner.

A still further object of this invention is to provide lamp operating mechanism which is positively actuated as the steering devices are moved, provision being also made for disconnecting the lamp actuating means to avoid wearing of the parts or for other purposes.

With the foregoing and other objects in view, the invention consists in the details of construction, and in the arrangement and combination of parts to be hereinafter more fully set forth and claimed.

In describing the invention in detail, reference will be had to the accompanying drawings, wherein like characters denote corresponding parts in the several views, and in which—

Figure 1:
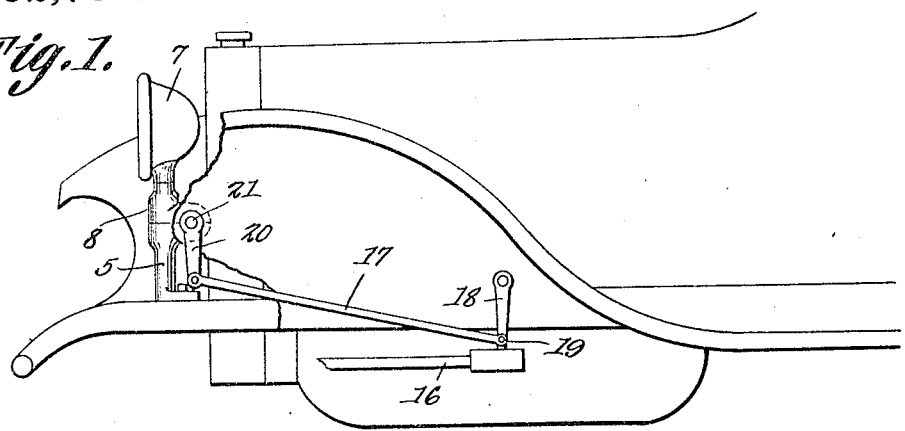
Figure 1 illustrates a view in elevation of a fragment of an automobile with the invention applied thereto.
Figure 2:
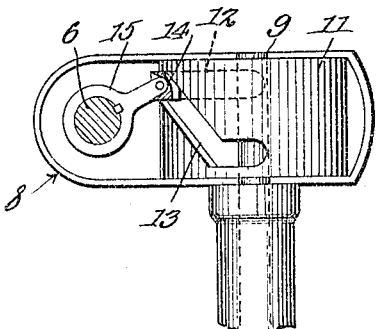
Fig. 2 illustrates a sectional view of the lamp supporting posts with the operating mechanism in plan.
Figure 3:
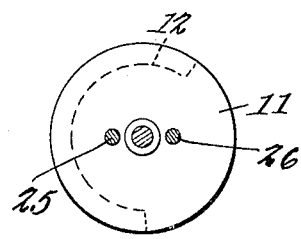
Fig. 3 illustrates a transverse sectional view with parts in elevation.
Figure 4:
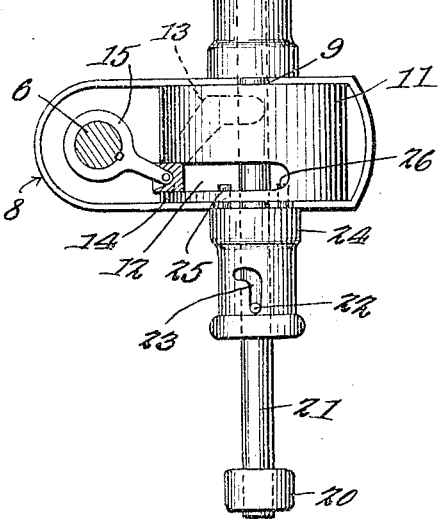
Fig. 4 illustrates a longitudinal sectional view of a fragment of the device.
Figure 4:
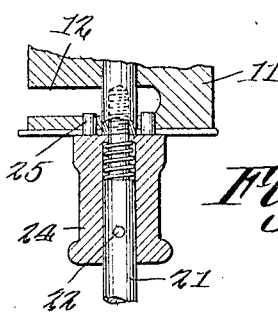

In these drawings 5 denotes a bracket, it being understood that two of such brackets are employed, one on each side of the car, although it will be understood that a single lamp may be operated by the lamp moving mechanism, and, therefore, I do not wish to be limited with respect to the number of lamps in connection with which the invention may be employed.

Each bracket may constitute a bearing in which a shank or shaft 6 of a lamp 7 is mounted so that the lamp may be rotatably supported with respect to the bracket, and if desired a suitable casing 8 may be supplied, associated with each bracket and lamp, constituting a housing, in which operating mechanism can be placed. The said housing may also be provided with apertures 9 in which a shaft 10 is journaled. Within each housing, I mount a drum 11 and attach it to the shaft 10 so that when the shaft is rotated, the drums will be rotated. Each drum has a radial slot 12 and a diagonal slot 13 which merge to form clearances for a cross head 14, each of said cross heads being pivotally connected to an arm 15 which is keyed on one of the shafts 6.

When the drums are applied and secured to the shaft 10, the slots of the drums are set so that one cross head will be affected oppositely to that of the cross head in the slot of the other drum, the said arrangement being for the purpose of causing one of the shafts of a lamp to be turned while the other is held stationary, and vice versa.

In order to actuate or rotate the shaft 10, I preferably effect a connection so that motion is derived from a steering arm 16, although other means may be provided for rotating the shaft 10, according to the direction of travel of the automobile as determined by the steering mechanism or the movement of the front wheels. In the present embodiment of the invention, I have pivotally connected a link 17 to an oscillating arm 18 by which the steering arm is reciprocated, the pivot of the link being indicated by the numeral 10 and I have pivotally connected the opposite end of the link 17 to an arm 20 which is connected to the shaft 21, the said shaft 21 having in the present showing, a pin 22 which projects through an irregularly shaped slot 23 in a clutch member 24, which is rotatable and slidable on the said shaft 21, and the said clutch member has lugs 25 entering apertures 26 in one of the drums, so that motion of the shaft 21 is communicated to one of the drums and by reason of the fact that the drums are mounted on the shaft 10, motion of one drum is communicated to the other drum through the said shaft 10. The irregularly shaped slot affords a clearance for the movement of the clutch member on the shaft 21 so that the clutch member may be uncoupled from the drum to avoid wear when the lamps are not to be operated.

When the parts are assembled, the relation must of course be such that a rearward thrust of the steering arm will rotate one of the drums to cause the cross head to travel in the radial slot and cause the other cross head to travel in the diagonally disposed portion of the slot and upon thrusting the steering rod in the opposite direction to a degree which will cause the front wheels to turn to guide the automobile in the opposite direction, the cross head which previously traveled in the radial slot would travel in the diagonally disposed portion of the slot, and the cross head, which had previously traveled in the diagonally disposed portion of the slot of that drum would travel in the radially disposed portion of the said slot.

Whether the near or off lamp should be turned is a matter of judgment and is within the control of the person assembling the mechanism and it is not the desire of the inventor to be limited with respect to the relation of these features, as that is arbitrarily within the province of the user of the invention.

I claim:

1. In dirigible lamps, brackets, lamps having shanks rotatable in the brackets, arms connected to the shanks, cross heads carried by the arms, a drum for each cross head, each of the said drums having a radial and a camming slot in which the cross head operates for holding the lamp against movement or for moving it according to the direction of movement of the drum, and means for moving the drums.

2. In dirigible lamps, lamp brackets, lamps having shanks rotatable in the brackets, members connected to the shanks, a drum for each of said connections, the said drums being provided with radial and opposed camming slots whereby when each lamp is moved, the other is held stationary, and means for rotating the drums according to the direction of travel of an automobile.

3. In dirigible lamps, lamp brackets, lamps having shafts rotatable in the brackets, members connected to the shanks, a drum for each of said connections, the said drums being provided with radial and opposed camming slots whereby when each lamp is moved, the other is held stationary, means for rotating the drums according to the direction of travel of an automobile, means for communicating the motion of the direction controlling means of an automobile to the said drums, and means for disconnecting the rotating means to permit the direction controlling means of the automobile to operate without actuating the drums.

STEPHEN A. HUNTLEY.

Copies of this patent may be obtained for five cents each, by addressing the "Commissioner of Patents, Washington, D. C."